US011487583B2

(12) United States Patent
Peter et al.

(10) Patent No.: US 11,487,583 B2
(45) Date of Patent: Nov. 1, 2022

(54) AUTOMATIC ASSET SELECTION AND CREATION SYSTEM AND METHOD

(71) Applicant: Visa International Service Association, San Francisco, CA (US)

(72) Inventors: Sabu Peter, Foster City, CA (US); Karthikeyan Kandasamy, Fremont, CA (US); Hong Zhu, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 660 days.

(21) Appl. No.: 16/523,606

(22) Filed: Jul. 26, 2019

(65) Prior Publication Data

US 2021/0026697 A1 Jan. 28, 2021

(51) Int. Cl.
*G06F 9/54* (2006.01)
*G06N 5/00* (2006.01)
*G06N 20/10* (2019.01)
*G06N 20/20* (2019.01)
*G06K 9/62* (2022.01)
*G06F 9/50* (2006.01)
*G06N 20/00* (2019.01)

(52) U.S. Cl.
CPC ......... *G06F 9/5027* (2013.01); *G06K 9/6227* (2013.01); *G06N 20/00* (2019.01)

(58) Field of Classification Search
CPC combination set(s) only.
See application file for complete search history.

(56) References Cited

U.S. PATENT DOCUMENTS

2013/0263181 A1* 10/2013 Impollonia ........ H04N 21/2668
725/32

* cited by examiner

*Primary Examiner* — Hsiungfei Peng
(74) *Attorney, Agent, or Firm* — Kilpatrick Townsend & Stockton LLP

(57) ABSTRACT

A method includes a deployment computer receiving a client request message comprising a plurality of established parameters and established values for the established parameters, and inquiry parameters and inquiry values for the inquiry parameters from a client computer. For each model of a plurality of models stored in a database, the deployment computer can determine if a model in the plurality of models is a suitable model based on a likelihood value. The deployment computer can then generate one or more client response messages comprising one or more assets created by one or more suitable models. The deployment computer can then transmit the one or more client response messages comprising the one or more assets to the client computer.

20 Claims, 5 Drawing Sheets

AUTOMATIC ASSET SELECTION AND CREATION SYSTEM AND METHOD

CROSS-REFERENCE TO RELATED APPLICATIONS

None.

BACKGROUND

Computers can create virtual environments from which they may launch a number of applications. However, merely having the virtual environments may not solve an entity's needs. Further, many dependencies between applications may be needed in the virtual environment, and can be created by a subject matter expert. Security and privacy rules may need to be followed by every application in the virtual environment and may vary between applications. As security and operational needs quickly change, the applications in a virtual environment quickly become outdated, for example, become potentially unsecure to malicious parties.

Embodiments of the invention address this problem and other problems individually and collectively.

SUMMARY

Embodiments of the invention are related to methods and systems for automatically selecting and creating assets.

One embodiment is directed to a method comprising: a) receiving, at a deployment computer, a client request message comprising a plurality of established parameters and established values for the established parameters, and inquiry parameters and inquiry values for the inquiry parameters from a client computer; b) for each model of a plurality of models stored in a database, determining, by the deployment computer, if a model in the plurality of models is a suitable model based on a likelihood value; c) generating, by the deployment computer, one or more client response messages comprising one or more assets created by one or more suitable models; and d) transmitting, by the deployment computer, the one or more client response messages comprising the one or more assets to the client computer.

Another embodiment is directed to a deployment computer comprising: a processor; a memory device; and a computer-readable medium coupled to the processor, the computer-readable medium comprising code executable by the processor for implementing a method comprising: a) receiving a client request message comprising a plurality of established parameters and established values for the established parameters, and inquiry parameters and inquiry values for the inquiry parameters from a client computer; b) for each model of a plurality of models stored in a database, determining if a model in the plurality of models is a suitable model based on a likelihood value; c) generating one or more client response messages comprising one or more assets created by one or more suitable models; and d) transmitting the one or more client response messages comprising the one or more assets to the client computer.

Another embodiment is directed to a method comprising: generating, by a client computer, a client request message comprising a plurality of established parameters and values for the established parameters, and inquiry parameters and values for the inquiry parameters; transmitting, by the client computer, the client request message to a deployment computer, wherein the deployment computer, for each model of a plurality of models stored in a database, determines if a model in the plurality of models is a suitable model based on a likelihood value, and generates one or more client response messages comprising one or more assets created by one or more suitable models; and receiving, by the client computer, the one or more client response messages from the deployment computer.

Another embodiment is directed to a client computer comprising: a processor; a memory device; and a computer-readable medium coupled to the processor, the computer-readable medium comprising code executable by the processor for implementing a method comprising: generating a client request message comprising a plurality of established parameters and values for the established parameters, and inquiry parameters and values for the inquiry parameters; transmitting the client request message to a deployment computer, wherein the deployment computer, for each model of a plurality of models stored in a database, determines if a model in the plurality of models is a suitable model based on a likelihood value, and generates one or more client response messages comprising one or more assets created by one or more suitable models; and receiving the one or more client response messages from the deployment computer.

Further details regarding embodiments of the invention can be found in the Detailed Description and the Figures.

DETAILED DESCRIPTION

Figure 1:
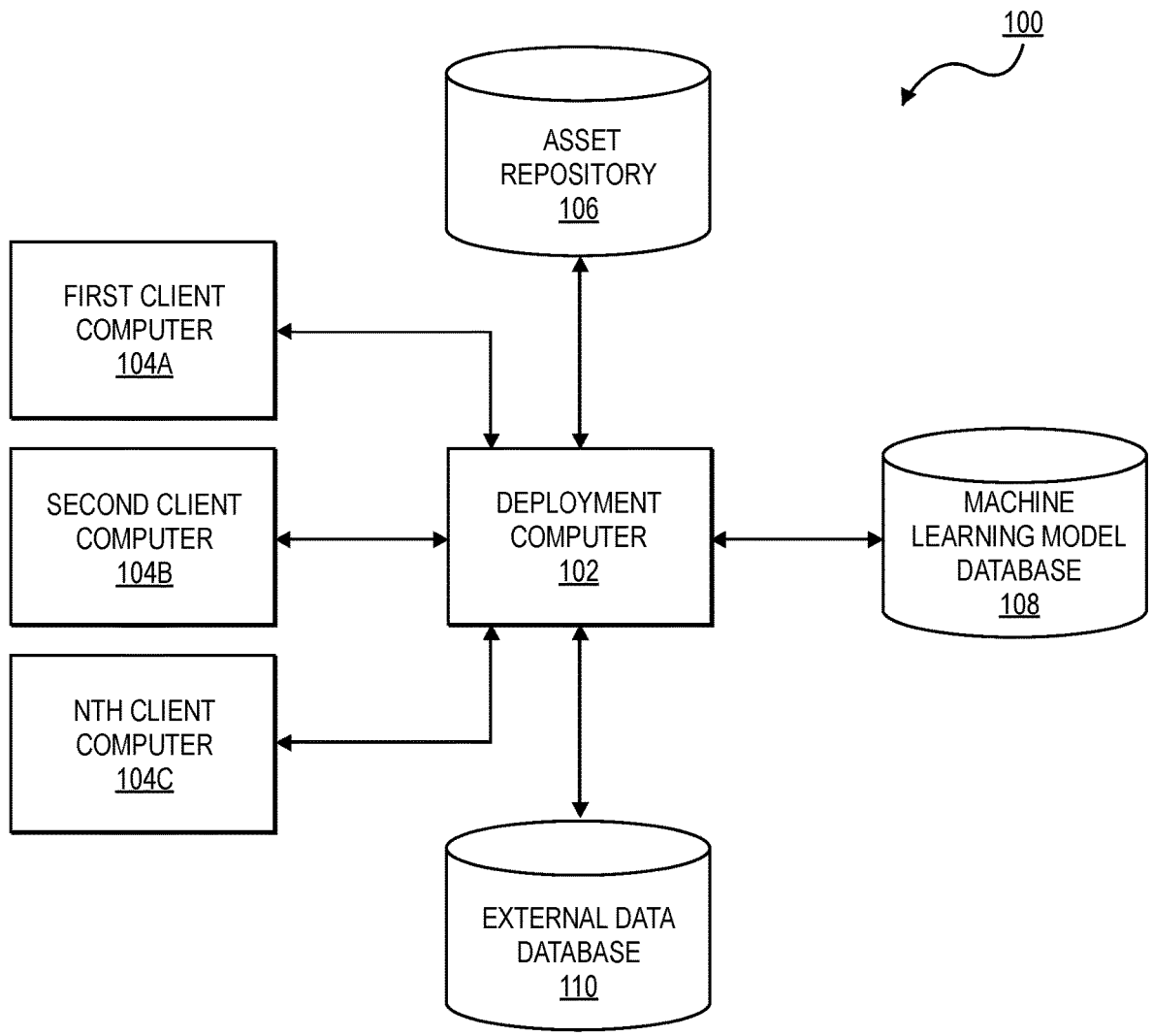
FIG. 1 shows a block diagram of an asset selection and creation system according to embodiments.

Prior to discussing embodiments of the invention, some terms can be described in further detail.

An "artificial intelligence model" or "AI model" can include a model that may be used to predict outcomes in order achieve a target goal. The AI model may be developed using a learning algorithm, in which data is classified based on known or inferred patterns. An AI model may also be referred to as a "machine learning model."

In some embodiments, an AI model can include a weak AI or a strong AI. A "weak AI" can include artificial intelligence focused on a narrow task. A week AI cannot go beyond the boundaries of the construct for which it was designed. A "strong AI" can include artificial intelligence focused a wide task. A strong AI can artificially include cognitive abilities into the decision making to more accurately mimic a human mind.

"Established parameters" can include measurable factors that have been previously established by, for example, an entity requesting an asset. An established parameter can be associated with an established value. An established parameter can be any suitable measurable factor. For example, an established parameter can be "location," "security," "environment," "technology," "asset sensitivity," "code repository," "asset process," and/or "operational process."

"Established values" can include values having numerical amounts associated with established parameters. An established value can be a measured value (e.g., 7, 10, 98, 5000, etc.). In some embodiments, an established value may correspond to a reference code (i.e., reference value). For example, an established parameter of "asset sensitivity" can correspond to an established value of "secret," which may be encoded as a reference code of "1," whereas a value of "0" may correspond to "non-secret." Alternatively, "asset sensitivity" may have a value on a scale, such as a scale 1-10, where 1 is the least secure and 10 is the most secure.

"Inquiry parameters" can include determinable factors inquired by an entity, device, and/or system. Inquiry parameters can relate to data and/or information inquired by an entity, device, and/or system. Inquiry parameters may relate to questions that may be asked about an asset, such as whether or not the asset can be implemented by an entity, device, and/or system. For example, inquiry parameters can be "new technology," "new software," "enhanced assessment process," "new data patterns," and/or "errors." As an illustration, the parameter "new software" may represent a question such as "Do we need to upgrade to a 2019 version of a virtual environment software?"

"Inquiry values" can include values having a numerical amount associated with inquiry parameters. An inquiry value can be a measured value (e.g., 7, 10, 98, 5000, etc.). In other embodiments, an inquiry value can be a reference code. As an illustrative example, an inquiry parameter can be "new technology" corresponding to an inquiry value of "hardware required," which can be encoded as a reference code of, for example, "121." An entity, device, and/or system can inquire if new hardware is required by the entity, device, and/or system from a deployment computer using the reference code "121." In some embodiments, the inquiry parameters and corresponding inquiry values can indicate questions about which the entity, device, and/or system is inquiring about.

Additional inquiry parameter/inquiry value pairs can include, for example, "new software"/"upgrade to 2019 version," "enhanced assessment process"/"security validation for upgrade," "new data patterns"/"data access via cloud," and "errors"/"number of errors using the model for execution." In some embodiments, a decision as to which established values and inquiry values correspond to which parameters (e.g., in a standard) can be made prior to including the established values and the inquiry values in client request message.

A "historic decision value" represented as "D" can include a value representing one or more prior decisions. A historic decision value can include any suitable value. For example, a historic decision value can include an integer in the range of 0-100. In some embodiments, each model stored in a database may be associated with a historic decision value. A historic decision value can depend on previous decisions regarding whether or not a given model was determined to be suitable for a given request. For example, a historic decision value for a model can be updated based on a likelihood value determined for the model. In some embodiments, historic decision values may be associated with a client computer. For example, historic decision values for similar models may differ by client computer. In other embodiments, historic decision values for similar models may differ by types of entities which operate client computers. For example, client computers operated by transportation authorities may be associated with a different set of historic decision values than client computers operated by authorization authorities.

A "likelihood value" represented as "L" can include a value representing a state or fact of something that is probable to occur. A likelihood value may be in a range of 0 to 100, or other suitable range (e.g., 0 to 1). In some embodiments, a likelihood value can represent a likelihood that a model is relevant for a particular client request message.

A "creation probability value" represented as "z" can include a value of the extent to which creation is possible. In some embodiments, a creation probability value can be a value of the extent to which creation of a new machine learning model is possible. For example, a machine learning model associated with a large creation probability value (e.g., 90%) has a high possibility of being created. Conversely, a machine learning model associated with a small creation probability value (e.g., 2%) has a low possibility of being created.

"Additional data" represented as "k" can include data supplementary to data that is already present. Additional data can include any suitable data, for example, weather data, transportation data, travel data, audit logs, maintenance logs, current event data, change control patterns, and/or any other suitable data from an external data source.

An "asset" can include a digital resource. In some embodiments, assets can include infrastructure, software, and/or applications in a virtual environment. In some embodiments, an asset can include an application in a virtual environment. An asset can consist of web platforms, APIs, and/or other services which may involve provisioning the infrastructure, software, etc., automating application life cycles, containerization, operational support, and/or anomaly detection.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

A "processor" may include a device that processes something. In some embodiments, a processor can include any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

Embodiments of the invention allow for a deployment computer capable of determining suitable models based on data received from a client computer. In some embodiments, the deployment computer can also be capable of generating new models based on data received from the client computer.

As an illustrative example, a client computer can generate a client request message requesting a virtual environment comprising one or more assets. The client request message can comprise established parameters, established values, inquiry parameters, and inquiry values. As an example, the client request message may request a virtual environment that implements an asset that is a transit application.

The established parameters can include location, domain, asset sensitivity, and technical owners, and the established values can include values that correspond to the established parameters. For example, in the above example, the established values can include "San Francisco," "transit," "non-secret," and "other data regarding a client computer (e.g., IP address, etc.)," respectively corresponding to the established parameters of "location," "domain," "asset sensitivity," and "technical owners." The inquiry parameters can include "new technology" and "new software" and the inquiry values can include values that correspond to the established parameters. The inquiry parameter of new technology (e.g., "is new hardware required to implement the asset?") can correspond to the inquiry value of "hardware required," and can be encoded as a value of "130." The inquiry parameter of "new software" (e.g., "is new software required to implement the asset?") can correspond to the inquiry value of "software required," and can be encoded as a value of "140." As noted above, in some embodiments, the inquiry values can correspond to, for example, questions that the client computer is requesting the deployment computer to answer (e.g., "Is new software required to implement the transit application?"). It is understood that the aforementioned established values and inquiry values can be encoded into numerical values as described herein. The client computer can transmit the client request message to the deployment computer.

Upon receiving the client request message, the deployment computer can, for each model of a plurality of models, determine if a model is a suitable model based on a likelihood value. In some embodiments, the deployment computer can determine a sum of the established values as well as a sum of the inquiry values. The deployment computer can mathematically evaluate the sums as well as a decision value for each model to determine a likelihood that the model is suitable.

For example, the deployment computer can determine the sum of the established values and the sum of the inquiry values to be 141 and 89, respectively. The deployment computer can multiply a tuple formed from the sum of the established values and the sum of the inquiry values (e.g., (141, 89)) by a decision value (e.g., 80) associated with a first model, to determine a tuple of $D_i(\Sigma x_i, \Sigma y_i)$ to be (11280, 7120). The deployment computer can determine a difference between the two values of the tuples to be 4160. The model can also be associated with particular established values and inquiry values. The deployment computer can determine that the first model (i=1) includes the same established values and inquiry values as the received established values and inquiry values, and can thus have a parameters matched value of 100%. Due to these factors, the deployment computer can then determine a likelihood value of 100%. The deployment computer can then determine that the likelihood of 100% is greater than a predetermined threshold (e.g., 70%). The deployment computer can run the suitable model to create the transit application and then transmit the transit application to the client computer.

I. SYSTEMS

Embodiments are usable with various systems, e.g., transit systems, payments systems, document access system, building access system, and the like. Although examples of transit systems are described, embodiments are equally applicable for other systems.

A. Overview

FIG. 1 shows a block diagram of an asset system according to embodiments. The system 100 comprises a deployment computer 102, a first client computer 104A, a second client computer 104B, an Nth client computer 104C, an asset repository 106, a machine learning model database 108, and an external data database 110. The deployment computer 102 can be in operative communication with any suitable number of client computers (e.g., the first client computer 104A, the second client computer 104B, and the nth client computer 104C). The deployment computer 102 may also be in operative communication with the asset repository 106, the machine learning model database 108, and the external data database 110.

For simplicity of illustration, a certain number of components are shown in FIG. 1. It is understood, however, that embodiments of the invention may include more than one of each component. In addition, some embodiments of the invention may include fewer than or greater than all of the components shown in FIG. 1. For example, the system 100 may comprise 5, 10, 50, 1300, etc. client computers.

Messages between at least the deployment computer 102 and the client computers 104A, 104B, and 104C in FIG. 1 can be transmitted using a secure communications protocols such as, but not limited to, File Transfer Protocol (FTP); HyperText Transfer Protocol (HTTP); Secure Hypertext Transfer Protocol (HTTPS), SSL, ISO (e.g., ISO 8583) and/or the like. The communications network that may reside between the deployment computer 102 and the client computers 104A, 104B, and 104C may include any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. The communications network can use any suitable communications protocol to generate one or more secure communication channels. A communications channel may, in some instances, comprise a secure communication channel, which may be established in any known manner, such as through the use of mutual authentication and a session key, and establishment of a Secure Socket Layer (SSL) session.

The deployment computer 102 can include a computing device (e.g., a computer, etc.) that has the appropriate hardware and software to deploy assets as described herein. The deployment computer 102 can be configured to receive a client request message comprising a plurality of established parameters and values for the established parameters, and inquiry parameters and values for the inquiry parameters from the client computers 104A, 104B, and 104C. The deployment computer 102 can also be configured to determine, for each model of a plurality of software application models stored in a database, if a software model in the plurality of software application models is a suitable model based on a likelihood value. The deployment computer 102 can also be configured to generate one or more client response messages comprising one or more suitable software application models. The deployment computer 102 can also be configured to transmit the one or more client response messages comprising the one or more suitable models to the client computer.

The client computers 104A, 104B, and 104C can each include a computer in a client-server model, where the server includes the deployment computer 102. The first client computer 104A can be capable of generating client request messages comprising established parameters, established values, inquiry parameters, and inquiry values. For example, in some embodiments, a user of the first client computer 104A can select and/or input on a display (or other input device) established values and inquiry values for the established parameters and inquiry parameters. The first client computer 104A can then transmit the client request message over any suitable communication channel to the deployment computer 102.

The first client computer 104A can also be capable of receiving one or more client response messages comprising one or more suitable models and/or asset from the deployment computer 102. The second client computer 104B and the Nth client computer 104C can have the same functionality as the first client computer 104A.

The asset repository 106 can include any suitable database. The asset repository 106 can store previously determined and/or created assets. In some embodiments, the asset repository 106 can further store asset configurations, asset templates, asset virtualization histories, and/or asset rules.

The machine learning model database 108 can include any suitable database. The machine learning model database 108 can store machine learning models. The machine learning models in the machine learning model database 108 can include support vector machines (SVMs), neural networks, decision trees, Bayesian networks, genetic algorithms, and/or other types of machine learning models that utilize supervised learning, unsupervised learning, semi-supervised learning, reinforcement learning, anomaly detection, and/or the like.

The external data database 110 can include any suitable database. The external data database 110 can store data received from external sources. For example, the external data database 110 can store additional data. The additional data can include, for example, weather data, transportation data, travel data, audit logs, maintenance logs, current event data, change control patterns, etc.

The asset repository 106, the machine learning model database 108, and the external data database 110 can be conventional, fault tolerant, relational, scalable, secure databases such as those commercially available from Oracle™ or Sybase™.

B. Deployment Computer

Figure 2:
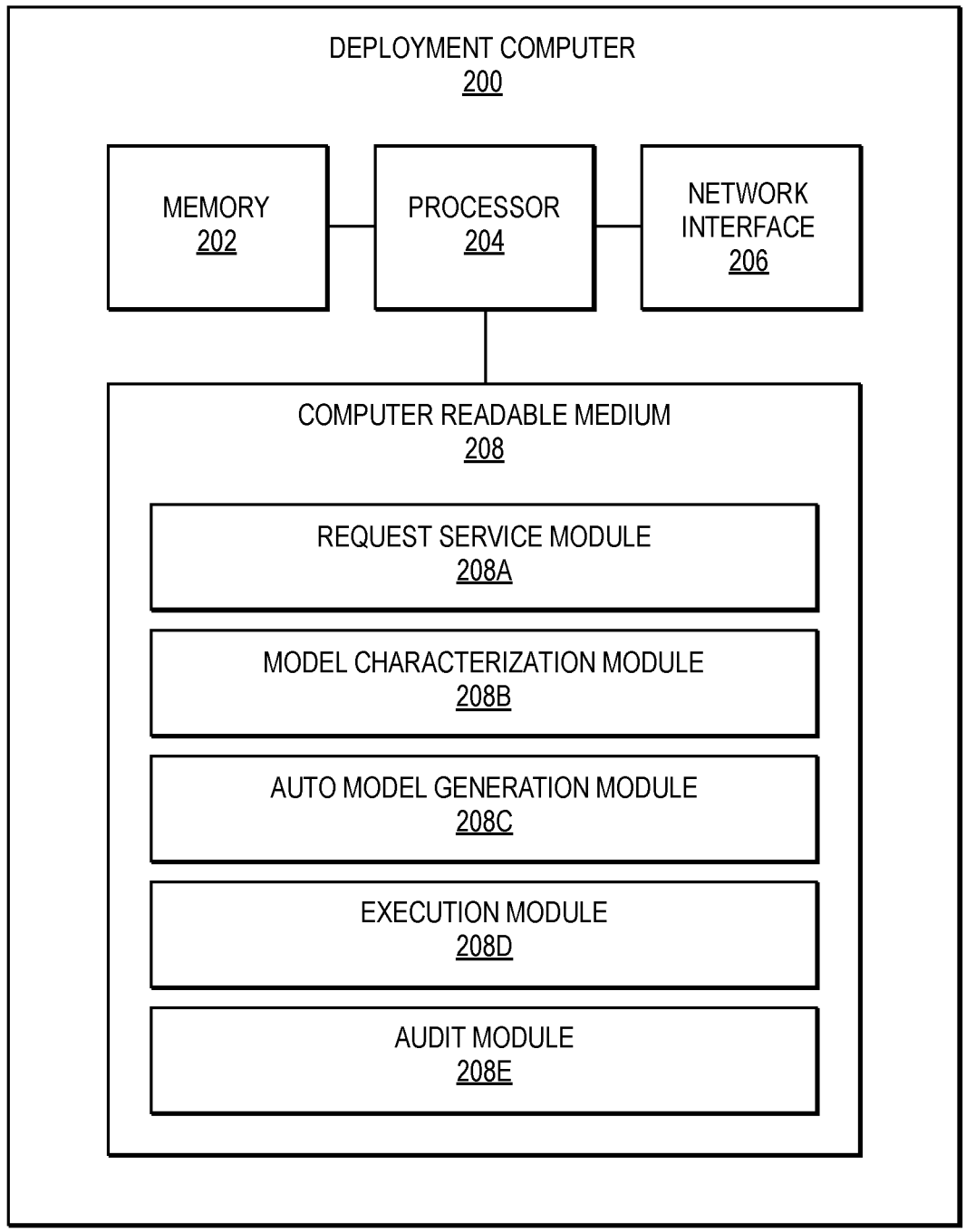
FIG. 2 shows a block diagram of a deployment computer according to embodiments.

FIG. 2 shows a block diagram of a deployment computer 200 according to embodiments. The exemplary deployment computer 200 may comprise a processor 204. The processor 204 may be coupled to a memory 202, a network interface 206, and a computer readable medium 208. The computer readable medium 208 can comprise a request service module 208A, a model determination module 208B, a model characterization module 208C, an execution module 208D, and an audit module 208E.

The memory 202 can be used to store data and code. The memory 202 may be coupled to the processor 204 internally or externally (e.g., cloud based data storage), and may comprise any combination of volatile and/or non-volatile memory, such as RAM, DRAM, ROM, flash, or any other suitable memory device. For example, the memory 202 can store cryptographic keys, established parameters, established values, inquiry parameters, and inquiry values.

The computer readable medium 208 may comprise code, executable by the processor 204, for performing a method comprising: a) receiving, at a deployment computer, a client request message comprising a plurality of established parameters and established values for the established parameters, and inquiry parameters and inquiry values for the inquiry parameters from a client computer; b) for each model of a plurality of models stored in a database, determining, by the deployment computer, if a model in the plurality of models is a suitable model based on a likelihood value; c) generating, by the deployment computer, one or more client response messages comprising one or more assets created by one or more suitable models; and d) transmitting, by the deployment computer, the one or more client response messages comprising the one or more assets to the client computer.

The request service module 208A may comprise code or software, executable by the processor 204, for receiving and parsing client request messages. The request service module 208A, in conjunction with the processor 204, can receive a client request message comprising established parameters, established values, inquiry parameters, and inquiry values. The request service module 208A, in conjunction with the processor 204, can parse the established parameters, the established values, the inquiry parameters, and the inquiry values in the client request message in any suitable manner. For example, in some embodiments, the data in the established parameters, the established values, the inquiry parameters, and the inquiry values can be separated by delimiters in the client request message. The request service module 208A, in conjunction with the processor 204, can then parse the client request message using the delimiters.

The model determination module 208B may comprise code or software, executable by the processor 204, for determining whether or not a model of a plurality of models is suitable. In some embodiments, the model determination module 208B can include a weak AI which may perform a narrow task of determining whether or not a model is suitable. The model determination module 208B, in conjunction with the processor 204, can iterate through a plurality of models stored in a machine learning model database to determine if each model is suitable or not suitable based on a likelihood value.

The model determination module 208B, in conjunction with the processor 204, can determine the likelihood value, L, for each model in the machine learning model database using, at least, the following equation:

$$L(i) = D_i \left( \sum_{a=1}^{N} \sum_{b=1}^{M} (x_a, y_b) \right)$$

where i can be a model (e.g., model number 1), $D_i$ can be a historic decision value for each model i, $x_a$ can include the established values, $y_b$ can include the inquiry values, a and b can be the starting value of the summations (e.g., 1), N can be the total number established values, and M can be the total number of inquiry values.

The model determination module 208B, in conjunction with the processor 204, can determine a sum of the established values $x_a$ (referred to as an established sum) as well as a sum of the inquiry values $y_b$ (referred to as an inquiry sum). The established sum and the inquiry sum can be in the form of a tuple (e.g., (established sum, inquiry sum)). The model determination module 208B, in conjunction with the processor 204, can then multiply the tuple comprising the established sum and the inquiry sum by the historic decision value $D_i$ to determine a likelihood value L for each model i.

In some embodiments, the model determination module 208B, in conjunction with the processor 204, can multiply the tuple by each historic decision value $D_i$ for each model i, respectively. The model determination module 208B, in conjunction with the processor 204, can determine i number of likelihood values L.

The model determination module 208B, in conjunction with the processor 204, can then compare the determined likelihood values L for each model i to a predetermined threshold (e.g., 80, 90, etc.). If the model determination module 208B, in conjunction with the processor 204, determines that a particular likelihood value L is greater than or equal to the predetermined threshold, then the model determination module 208B, in conjunction with the processor 204, can determine that the model i, associated with the likelihood value L, is suitable.

In some embodiments, the model determination module 208B, in conjunction with the processor 204, can further determine the likelihood value L based on a difference value, a number of parameters matched and the historic decision value $D_i$. The difference value can be a difference between the established sum multiplied by the historic decision value and the inquiry sum multiplied by the historic decision value. The number of parameters matched can be the number of parameters of the established parameters and the inquiry parameters that match parameters associated (e.g., via a tag) with the model.

In some embodiments, the model determination module 208B, in conjunction with the processor 204, can determine that more than one model i is a suitable model. An illustrative example will be described in reference to FIGS. 4 and 5 below.

In some embodiments, the initial values for the historic decision values $D_i$ can be developed by subject matter experts in order to give the model determination module 208 a starting point. In other embodiments, initial values for the historic decision values $D_i$ can be random values. The historic decision values $D_i$ can then be modified based on at least determined likelihood values as decisions are made regarding whether or not a model is suitable.

After a suitable amount of time has passed since the implementation of the model determination module 208B, the model characterization module 208C may activate. For example, the deployment computer 200 can determine that in the past 12 months of operation of the model determination module 208B, there is currently a success rate of 99% as determined using a minimum sum of errors for N data points.

The model characterization module 208C may comprise code or software, executable by the processor 204, for characterizing new models. The model characterization module 208C can include a strong AI configured to perform a wide task of characterizing generated models. The model characterization module 208C, in conjunction with the processor 204, can utilize existing models stored in the machine learning model database, established values, inquiry values, and additional data to generate new models.

The model characterization module 208C, in conjunction with the processor 204, can determine characterize a new model using, at least, the following equation:

$$\sum i = \sum_{a=1}^{i+1} \sum_{b=1}^{i+1} \sum_{c=1}^{i+1} (x_a, y_b, k_c)$$

where i can be a model (e.g., model number 1, 5, etc.), $x_a$ can include the established values, $y_b$ can include the inquiry values, $k_c$, can include additional data, and a, b, and c can be the starting values of the summations (e.g., 1). In some embodiments, a creation probability value $z_a$ can be taken into account, based on whether or not a model has a probability of being created (e.g., a value from 0-1). For example, if $z_a=0$ then no new model may be generated, whereas if $z_a=1$, then a new model may be generated and the subsequently labeled (i.e., characterized) by the above equation.

The model characterization module 208C, in conjunction with the processor 204, can determine a sum of the established values $x_a$ (referred to as an established sum), a sum of the inquiry values $y_b$ (referred to as an inquiry sum), and a sum of the additional data $k_c$ (referred to as an additional data sum). The established sum, the inquiry sum, and the additional data sum can be in the form of a tuple.

The tuple comprising the established sum, the inquiry sum, and the additional data sum can be labeled as the next model (e.g., i+1). The model can be trained in any suitable manner. For example, the model can be a support vector machine (SVM) trained on the additional data associated with the established values and the inquiry values. In other embodiments, the model can include a decision tree trained on the established values, inquiry values, and additional data. An illustrative example will be described in reference to FIGS. 4 and 5.

After training the model i+1, the deployment computer 200 can store the new models (e.g., model number i+1) created by the model characterization module 208C, into the machine learning model database. The new model can be stored in the machine learning model database in association with the established sum, the inquiry sum, and the additional data sum.

The execution module 208D can include may comprise code or software, executable by the processor 204, for executing models. The execution module 208D, in conjunction with the processor 204, can execute one or more machine learning models determined by the model determination module 208B as being suitable based on the received client request message.

The execution module 208D, in conjunction with the processor 204, can execute a model related to, for example, creating a transit application. The execution module 208D can run the model yielding an asset of a transit application which may be provided to the client computer.

The audit module 208C can include may comprise code or software, executable by the processor 204, for auditing the output of run models. The audit module 208C, in conjunction with the processor 204, can perform an audit on the output of each model executed by the execution module 208D.

The audit module 208C, in conjunction with the processor 204, can verify dependencies between one or more assets. For example, the audit module 208C, in conjunction with the processor 204, can verify that a transit application asset correctly depends from an interaction application asset (e.g., a payment asset, an authentication asset, etc.). The audit module 208C, in conjunction with the processor 204, can verify that the transit application correctly depends on the authentication application (e.g., the transit TA correctly grants a user access to a train after the authentication application authenticates the user.

The network interface 206 may include an interface that can allow the deployment computer 200 to communicate with external computers. The network interface 206 may enable the deployment computer 200 to communicate data to and from another device (e.g., the client computer, etc.). Some examples of the network interface 206 may include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by the network interface 206 may include Wi-Fi™. Data transferred via the network interface 206 may be in the form of signals which may be electrical, electromagnetic, optical, or any other signal capable of being received by the external communications interface (collectively referred to as "electronic signals" or "electronic messages"). These electronic messages that may comprise data or instructions may be provided between the network interface 206 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

In some embodiments, the deployment computer 200 can be integrated into a computer which can include a number of components besides the deployment computer 200. In other embodiments, the deployment computer 200 may operate in conjunction with one or more additional computers, each of which can comprise one or more components. For example, a component can include an asset repository that can contain the virtualization of clients' assets which can be searchable by the deployment computer 200 for reuse and to locate an existing asset virtualization. Another component can include a machine learning component capable of determining steps, process, and components needed for a new asset virtualization requests by analyzing historical data.

Another component can store asset templates. The asset templates can contain a flow of asset virtualization with an end to end view. The asset templates can include patterns which can be used by the deployment computer and the machine learning component to mix and match to create a specific asset request steps. Yet another component can include asset rules which can define the events that needs to be invoked and the decisions based on the events response. An example can include an event to invoke a security assessment and approval prior to a launch of the asset environment. Another example is a business owner approval prior to the virtualization of an asset.

Embodiments, can utilize external or internal cloud technologies, containerization technologies, using Microservices, event based workflows, notification services, and metadata driven implementation, integrated with an client's data assets, source code management, continuous deployment, and/or security and operational processes.

C. Client Computer

Figure 3:
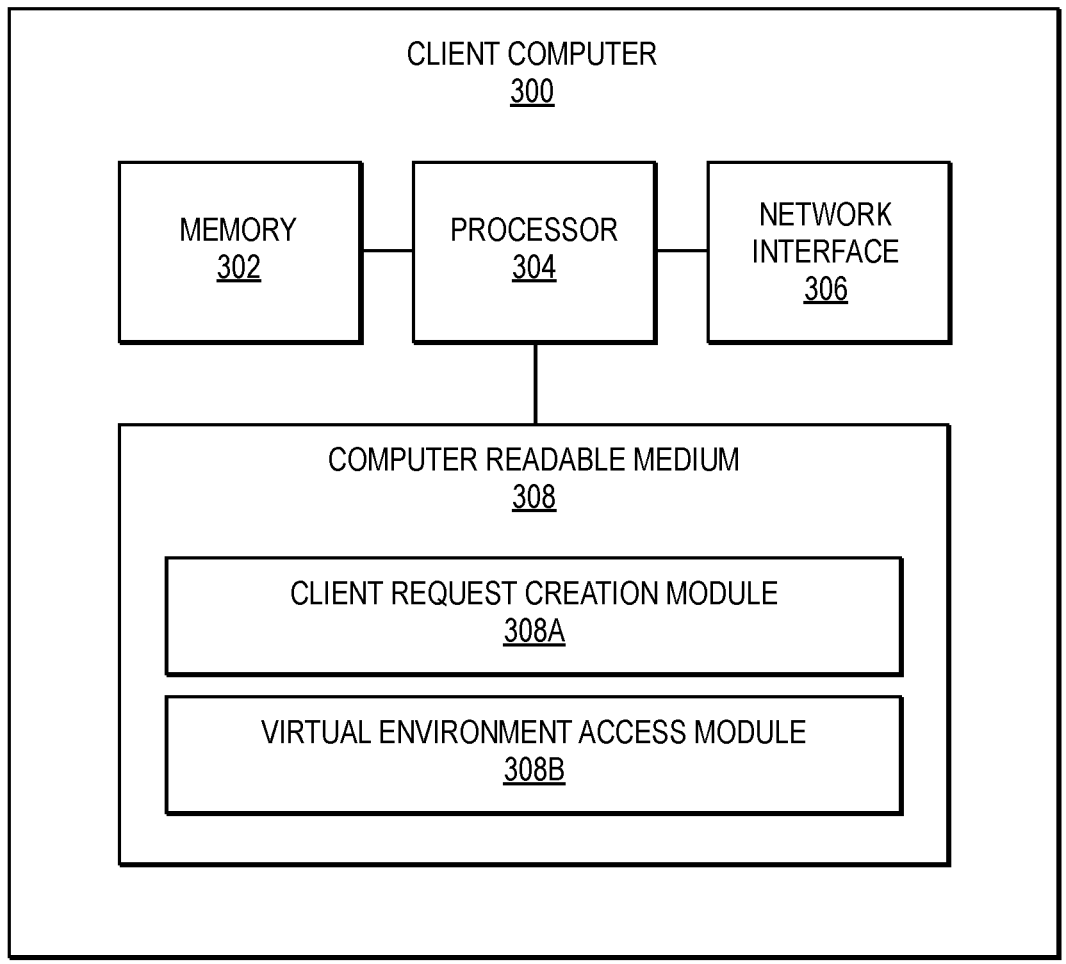
FIG. 3 shows a block diagram of a client computer according to embodiments.

FIG. 3 shows a block diagram of a client computer 300 according to embodiments. The exemplary client computer 300 may comprise a processor 304. The processor 304 may be coupled to a memory 302, a network interface 306, and a computer readable medium 308. The computer readable medium 308 can comprise a client request creation module 308A and a virtual environment module 308B.

The memory 302 can be used to store data and code and may be similar to the memory 202 as described herein. The computer readable medium 308 may comprise code, executable by the processor 304, for performing a method comprising: generating, by a client computer, a client request message comprising a plurality of established parameters and values for the established parameters, and inquiry parameters and values for the inquiry parameters; transmitting, by the client computer, the client request message to a deployment computer, wherein the deployment computer, for each model of a plurality of models stored in a database, determines if a model in the plurality of models is a suitable model based on a likelihood value, and generates one or more client response messages comprising one or more assets created by one or more suitable models; and receiving, by the client computer, the one or more client response messages from the deployment computer.

The client request creation module 308A may comprise code or software, executable by the processor 304, for creating client request messages. The client request creation module 308A, in conjunction with the processor 304, can compile established parameters, established values, inquiry parameters, and inquiry values into a client request message. The client request creation module 308A, in conjunction with the processor 304, can create the client request messages in any suitable format, as known to one of skill in the art. For example, in some embodiments, the client request messages can comprise dictionaries relating the established parameters to established values as well as relating inquiry parameters to inquiry values. In other embodiments, the client request messages can include tuples.

The virtual environment access module 308B may comprise code or software, executable by the processor 204, for accessing a virtual environment comprising one or more assets. The virtual environment access module 308B, in conjunction with the processor 304, can allow the client computer to access a virtual environment created and/or provided by a deployment computer.

The network interface 306 may be similar to the network interface 206 and need not be repeated here.

II. METHODS

Figure 4:
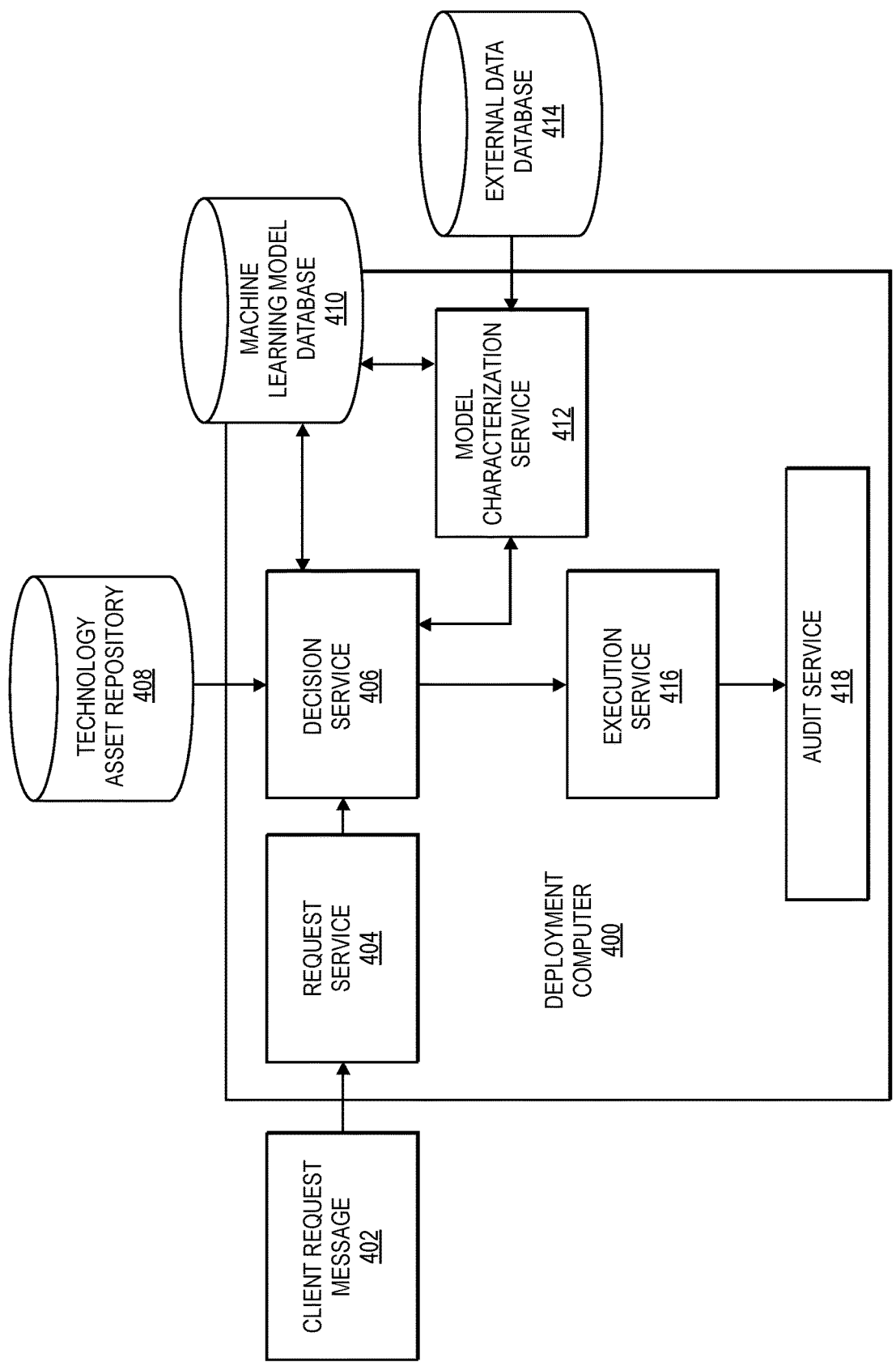
FIG. 4 shows a hybrid diagram of an overview of an asset request processing method according to embodiments.
Figure 5:
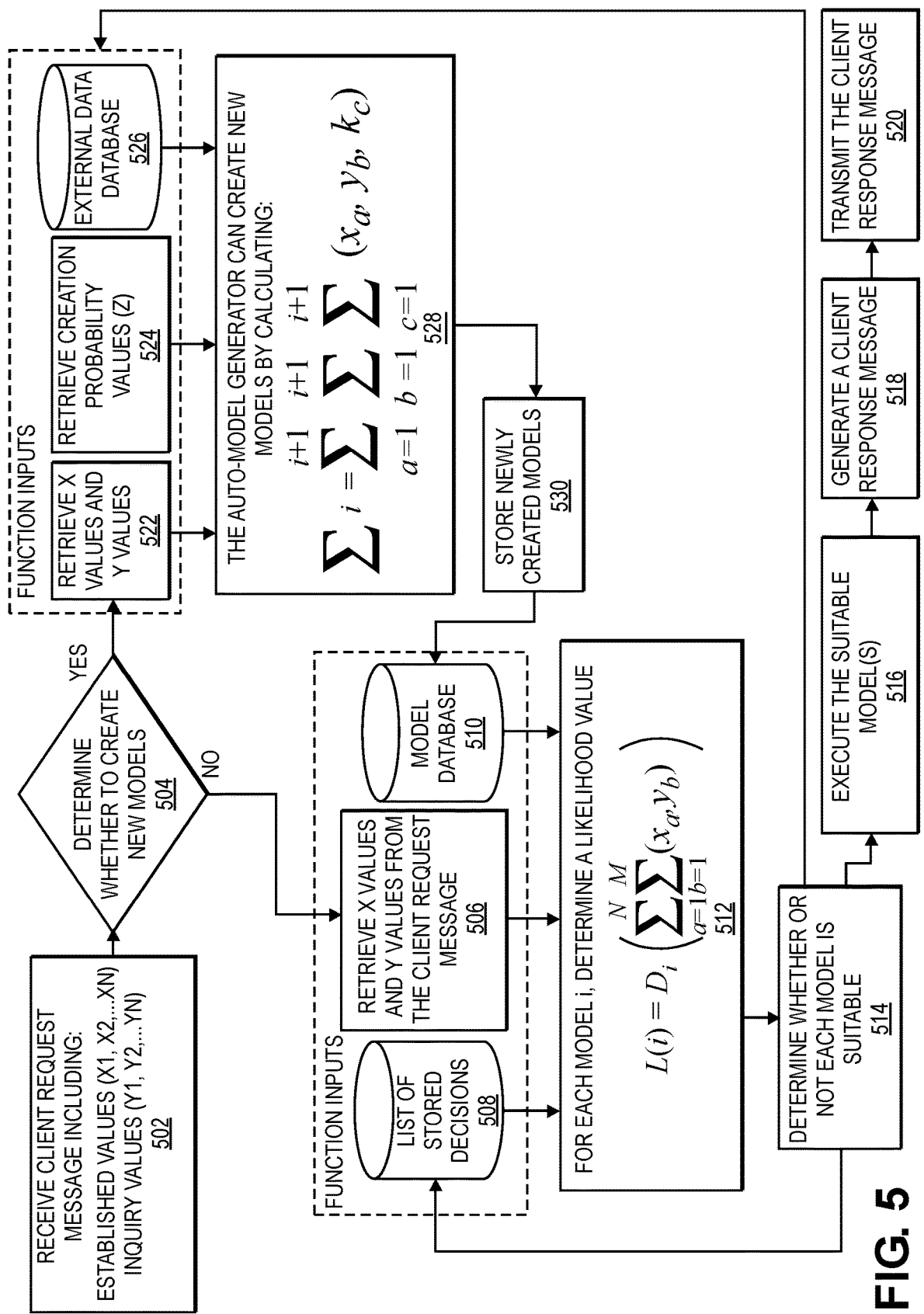
FIG. 5 shows a flowchart of an asset selection and creation method according to embodiments.

Embodiments can use the systems and apparatuses described above to select and/or create asset(s) in a virtual environment based on a client request message. FIGS. 4-5 describe some examples of such methods. In some embodiments, the deployment computer may include the deployment computer 102 or 200 of FIGS. 1 and 2, respectively. The client computer may include the computers 104A, 104B, 104C, or 300 of FIGS. 1 and 3, respectively.

Embodiments provide a flexible framework for virtualizing a client computer's asset(s) that covers the end to end process in an automated and scalable way addressing a plurality of dependencies within the virtual environment.

A. Overview

FIG. 4 shows a hybrid diagram of an overview of an asset request processing method according to embodiments. The method illustrated in FIG. 4 will be described in the context of a client computer requesting a virtual environment comprising applications relating to transportation. It is understood, however, that the invention can be applied to other circumstances (e.g., requesting a virtual environment comprising applications relating to authentication, authorization, interactions, etc.).

A client computer can generate a client request message 402 comprising a plurality of established parameters and a plurality of established values corresponding to the plurality of established parameters. The client request message 402 can further comprise a plurality of inquiry parameters and a plurality of inquiry values corresponding to the plurality of inquire parameters. The client computer can request a virtual environment including one or more assets, for example, transit applications.

The deployment computer 400 can receive the client request message 402 via a request service 404 (e.g., the request service module 208A of FIG. 2). In some embodiments, the request service 404 of the deployment computer 400 can parse the client request message 402. For example, the request service 404 can parse the client request message 402 based on delimiters included in the client request message 402, as described herein. In other embodiments, the request service 404 can parse the client request message 402 based on data items (e.g., tuples, dictionaries, etc.) included in the client request message.

As an example, the client request message 402 can include established values of "15," "99," "6," and "21," representing "transit," "requests per minute," "Colorado," and "non-secret," respectively. The established values of "15," "99," "6," and "21," can respectively correspond to the established parameters of "domain," "speed of operation," "location," and "security."

The client request message 402 can also include inquiry values of "5," "23," "54," and "7," representing "version number" (e.g., "can the asset be implemented with version number 5?"), "payment security validation" (e.g., "can the asset perform secure payments?"), "computer make number" (e.g., "can the asset be implemented on computer make number 54?") and "user privacy" (e.g., can the asset preserve user privacy according to regulatory requirement 7?"), respectively. The inquiry values of "5," "23," "54," and "7," can respectively correspond to the inquiry parameters of "virtual environment version number," "enhanced assessment," "hardware upgrade," and "regulatory compliance." The values and parameters of the client request message 402 are summarized in Table 1, below.

TABLE 1

Example client request message

| Established Parameter | Established Value | Inquiry Parameter | Inquiry Value |
|---|---|---|---|
| Domain | 15 = transit | Virtual environment version number | 5 = version number |
| Speed of operation | 99 = requests per minute | Enhanced assessment | 23 = payment security validation |
| Location | 6 = Colorado | Hardware upgrade | 54 = computer make number |
| Security | 21 = non-secret | Regulatory compliance | 7 = comply with user privacy requirement X |

It is understood, however, that the established parameters and the inquiry parameters can be associated with other established values and inquiry values, respectively, based on the type of request. For example, the established parameter "domain" can have established values of "13" (representing engineering), "14" (representing sales), etc. The established parameter "speed of operation" can have established values representing a number or requests per minute that the resulting asset can be capable of handling (e.g., 10, 55, 99, etc. requests per minute). The established parameter "location" can have a value representing, for example, a state (e.g., Colorado is the 6$^{th}$ state when listed alphabetically, whereas Wyoming can be the 50$^{th}$). The established parameter "security" can have a value in a range of 0-100, for example. A higher established value corresponding to "security" can indicate stronger security requested for the asset.

Further, the inquiry parameter "virtual environment version number" can have any suitable value representing the version of the virtual environment utilized by the client computer (e.g., version number 5). The "virtual environment version number" can represent a question of "can the asset be implemented with version number 5?" The inquiry parameter "enhanced assessment" can have values which encode particular additional assessments that the client computer requests the deployment computer to perform and/or verify. For example, the "enhanced assessment" can correspond to an inquiry value of 23 which may represent a question of "does the transportation application allow for secure payments?" As another example, the "enhanced assessment" can correspond to an inquiry value of 22 which may represent a question of "does the transportation application allow for secure biometric comparisons?" The inquiry parameter "hardware upgrade" can have values which represent a question, for example, "is the current hardware [inquiry value] capable of implementing the transportation application?" where the inquiry value can be 54 which encodes a computer (e.g., the hardware which may implement the transportation application) make number. The inquiry parameter "regulatory compliance" can have values which may represent a particular regulation (e.g., 7). "Regulatory compliance" can represent a question of "does the transportation application comply with regulation [inquiry value]?"

The deployment computer 400 can then determine if a model of a plurality of models is a suitable model based on a likelihood value using the decision service 406. The decision service 406 can retrieve one or more models from the machine learning model database 410. The decision service 406 can determine a likelihood value for each model based on the established values and inquiry values as well as a decision value(s).

In some embodiments, the deployment computer 400 can utilize machine learning (ML) and artificial intelligence (AI) routines that can use clustering and anomaly detection techniques to determine the likelihood of the reuse of the existing assets. The selection of assets can be determined by a "weak AI" using, for example, genetic algorithms to start with to determine the best fit templates and patterns to determine the steps, process, and assets. The decision service 406 can determine whether or not a model is suitable based on at least the following equation:

$$L(i) = D_i \left( \sum_{a=1}^{N} \sum_{b=1}^{M} (x_a, y_b) \right)$$

TABLE 2

Decision equation variables

| N | Number of established values |
| M | Number of inquiry values |
| i | Model |
| L | Likelihood |
| D | Decision |
| x | Established values |
| y | Inquiry values |

In some embodiments, the initial models, in the case of a decision service 406 of the deployment computer 400, can initially be developed externally to the deployment computer 400 and the deployment computer 400 can be provided the models to make its decision based on the inputs received in the client request message. As an illustrative example, the deployment computer 400 can determine an established sum. The established sum can be the sum of each of the established values. For example, the deployment computer 400 can determine the established sum to be 15+99+6+21=141. The deployment computer 400 can also determine an inquiry sum. The inquiry sum can be the sum of each of the inquiry values. For example, the deployment computer 400 can determine the inquiry sum to be 5+23+54+7=89. The established sum and the inquiry sum can be included in a tuple, as shown in the equation above. At this point, the likelihood value can be equal to:

$$L(i)=D_i(141, 89)$$

The deployment computer 400 can then determine the likelihood value L(i) for each model i, based on the historic decision value $D_i$ for each model i. For example, two models can be stored in the machine learning model database. The deployment computer 400 can retrieve each model in the machine learning model database, in this example, two models. A first model can be a transportation application creation model. A second model can be a sales application creation model. The deployment computer 400 can also retrieve a historic decision value $D_i$ for each model i. For example, the historic decision value for the first model $D_1$ can be equal to a value of 0.8, and the historic decision value for the second model $D_2$ can be equal to a value of 0.2.

The deployment computer 400 can determine the likelihood value for the first model (e.g., L(1)). For example, the deployment computer 400 can determine the likelihood value of the first model to be L(1)=0.8(141, 89)=(112.8, 71.2). The deployment computer 400 can also determine the likelihood value for the second model (e.g., L(2)). For example, the deployment computer 400 can determine the likelihood value of the second model to be L(2)=0.2(141, 89)=(28.2, 17.8).

After determining the likelihood values for each model of the plurality of models stored in the machine learning model database, the deployment computer 400 can determine whether or not each model of the plurality of models is suitable based on the likelihood value and a suitability threshold. The suitability threshold can be any threshold. For example, the suitability threshold can be a value of 100. The deployment computer 400 can compare the likelihood value of each model to the suitability threshold of 100.

For example, for the first model (e.g., the transportation application creation model), the deployment computer 400 can compare the likelihood value L(1)=(112.8, 71.2) to the threshold of 100. In some embodiments, the deployment computer 400 can determine whether or not at least one of the values of the tuple representing the likelihood value exceeds (e.g., is greater than or equal to) the suitability threshold. For the first model, the deployment computer 400 can determine that the first model is a suitable model since the first value of the tuple (e.g., 112.8) representing the likelihood value is greater than 100. The higher magnitude of the likelihood score is dependent upon a higher historic decision value, which implies a likely more acceptable model.

In other embodiments, the deployment computer 400 can compare the sum of the values of the tuple representing the likelihood value (e.g., 112.8+71.2=184) to the suitability threshold (e.g., 100). The deployment computer 400 can determine that the value of 184 exceeds the suitability threshold of 100 and thus that the transportation application creation model is a suitable model based on the client request message. The deployment computer 400 can then execute (i.e., perform) the transportation application creation model, described in further detail below.

The deployment computer 400 can also determine whether or not the second model is a suitable model in a similar manner. For example, the deployment computer 400 can compare the second likelihood value L(2)=(28.2, 17.8), corresponding to the sales application creation model (e.g., model number i=2), to the suitability threshold (e.g., 100). In some embodiments, the deployment computer 400 can determine that neither of the values of the tuple representing the likelihood value (e.g., (28.2, 17.8)) exceed the suitability threshold of 100, and thus that the second model is not a suitable model based on the client request message. In other embodiments, the deployment computer 400 can determine that the sum of the values of the tuple representing the likelihood value (e.g., 28.2+17.8=46) does not exceed the suitability threshold (e.g., 100), and thus that the second model is not a suitable model based on the client request message.

In some embodiments, the likelihood value can be further determined based on a difference between an established sum multiplied by a decision value and an inquiry sum multiplied by the decision value. The difference between the values can be referred to as a difference value. For example, $$\text{difference value}=D_i \Sigma x_i - D_i \Sigma y_i$$

For example, in some embodiments, the deployment computer 400 can modify the likelihood value L(i) using the difference value. In some embodiments, the deployment computer 400 can modify the likelihood value L(i) based on other determined values, such as a parameters matched value and a percentage difference value, described below.

As an example, Tables 3A and 3B illustrate various combinations of established values, inquiry values, and historic decision values. Table 3B is a continuation of the rows of Table 3A. Set 1 includes an example calculation of the likelihood value of each model based on values of a first client request message. The established parameters, established values, inquiry parameters, and inquiry values can include the parameters and values, described above, in the client request message for a transportation application.

TABLE 3A

Example likelihood computation

| Set | Formula | Established Sum * $D_i$ | Inquiry Sum * $D_i$ |
|---|---|---|---|
| 1 | L(i = 1) = 80 * (15 + 99 + 6 + 21.5 + 23 + 54 + 7) | 11280 | 7120 |
| 1 | L(i = 3) = 80 * (15 + 99 + 21.5 + 23 + 7) | 6750 | 1750 |
| 1 | L(i = 2) = 80 * (15 + 99 + 6.5 + 23 + 54) | 6000 | 4100 |
| 2 | L(i = 1) = 80 * (15 + 99 + 6 + 21.5 + 23 + 54 + 7) | 11280 | 7120 |
| 2 | L(i = 2) = 50 * (15 + 99 + 6 + 21.5 + 23 + 54 + 7) | 7050 | 4450 |
| 2 | L(i = 3) = 20 * (15 + 99 + 6 + 21.5 + 23 + 54 + 7) | 2820 | 1780 |

TABLE 3B

Continuation of example likelihood computation

| Difference Value | Parameters Matched | Percentage Difference Value | Rank | L(i) (e.g., Highest Rank %) |
|---|---|---|---|---|
| 4160 | 100% | 37% | 1 | 100% |
| 5000 | 75% | 74% | 2 | 98% |
| 1900 | 75% | 32% | 3 | 97% |
| 4160 | 100% | 37% | 1 | 100% |
| 2600 | 100% | 37% | 2 | 98% |
| 1040 | 100% | 37% | 3 | 97% |

Set 1 includes computations for three likelihood values for a first, second, and third model. The established values in set 1 can include [15, 99, 6, 21], as described above. The inquiry values in set 1 can include [5, 23, 54, 7], as described above. The initial likelihood value can include determining the established sum and the inquiry sum, as shown in the formula column of table 3A. The established sum * $D_i$ column shown in Table 3A illustrates the value of the established sum multiplied by the historic decision value, whereas the inquiry sum*$D_i$ column illustrates the value of the inquiry sum multiplied by the historic decision value. Set 1 includes a historic decision value of 80 for the first, second, and third models, in order to illustrate how the other values in the equation (e.g., the established values and the inquiry values) affect the likelihood value. However, it is understood that the historic decision value can be different for each model, for example, as depicted in set 2, which may correspond to a second client request message. As such the established column is equal to 11280, while the inquiry column is equal to 7120 for the first model (i=1).

The first model (e.g., i=1) of set 1 can be a transportation application creation model. The second model of set 1 can be a fraud determination model. The third model of set 1 can be a work schedule application creation model.

The deployment computer 400 can determine a difference value for each likelihood for each model. The difference value can be determined by taking the difference between the established sum*$D_i$ column and the inquiry sum*$D_i$ column. The deployment computer 400 can determine the difference value to determine a value representative of the difference between the received established values and the received inquiry values. A larger difference value can indicate a more suitable model. This is due to the fact that as more established values are provided and fewer inquiry values are provided by the client computer, the difference value becomes larger. More established values and fewer inquiry values allows the deployment computer 400 to be more certain that a particular model will fulfill the request, as fewer questions need to be answered.

For example, for the first model (e.g., model i=1) of set 1 of Tables 3A-3B, the deployment computer 400 can determine a difference value of 11280−7120=4160. For the third model, the deployment computer 400 can determine a difference value of 6750−1750=5000. For the second model, the deployment computer 400 can determine a difference value of 6000−4100=1900. Based solely on the difference value, it may appear that the third model is the best fit model of the three models, however the deployment computer 400 can also determine a parameters matched value.

The parameters matched value can represent the number of parameters (e.g., the established parameters and/or the inquiry parameters) received from the client computer that are the same as (i.e., match) the parameters (e.g., the established parameters and/or the inquiry parameters) stored in association with the model in the machine learning model database.

For example, the first model can be associated with the established values of [15, 99, 6, 21] corresponding to the established parameters of "domain," "speed of operation," "location," and "security." The second model can be associated with the established values of [15, 99, 6] corresponding to the established parameters of "domain," "speed of operation," and "location." The third model can be associated with the established values of [15, 99, 21], corresponding to the established parameters of "domain," "speed of operation," and "security."

The deployment computer 400 can determine the parameters match value for the established parameters. In some embodiments, the deployment computer 400 can determine the parameters match value for the inquiry parameters. In other embodiments, the deployment computer 400 can determine the parameters match value for the combination of established parameters and inquiry parameters. However, the determination of the parameters match value for the established parameters will be described herein.

The deployment computer 400 can determine that the first model is associated with four of the four received established parameters and thus has a parameters match value of 100%. The deployment computer 400 can determine that both the second model and the third model are associated with three of the four received established parameters and thus both have a parameters match value of 75%, even though the second model and the third model match a different 3 of the 4 established parameters.

A model that is associated with a larger parameters match value can be determined to be more suitable than a model that is associated with a smaller parameters match value. For example, the deployment computer 400 can determine that the first model (e.g., the transportation application creation model) is more suitable than the second model (e.g., the fraud determination model) as well as the third model (e.g., the work schedule application creation model).

Another value which may be used to modify the likelihood value to determine whether or not a model is suitable can be a percentage difference value. The percentage difference value can be the difference value represented as a percentage.

For example, the deployment computer 400 can determine the percentage difference value between the established values and the inquiry values. The following $$\frac{\sum x_i - \sum y_i}{\sum x_i}$$

equation may be used:

For example, for the first model, the deployment computer 400 can determine the percentage difference value to be (11280−7120)/11280=37%. For the second model, the percentage difference value can be 32%. For the third model, the percentage difference value can be 74%.

The deployment computer 400 can compare the likelihood value determined in the formula column, the difference value, the parameters matched, and the percentage difference value between for each model to determine a ranking of the models. For example, the larger the likelihood values determined, the higher the parameters matched, and the lower the percentage difference value, the higher the determined rank for the model. For example, the first model is determined to be rank 1, the third model to be rank 2, and the second model to be rank 3. The rank of the model can then be converted, by the deployment computer 400, to an overall likelihood value that the model is suitable, which can be, for example, a highest rank %. The conversion from the rank to the highest rank % can be performed in any suitable manner. For example, the highest rank % may be 100% for the rank 1 model, and equal to 100-rank for the following ranks.

In other embodiments, the deployment computer can store a predetermined and/or editable conversion table used to convert the rank to highest rank %. For example, the predetermined conversion table can indicate that the rank 1 model is of highest rank % equal to 100%, a rank 2 model corresponds to 80%, and a rank 3 model corresponds to 60%, etc.

Set 2 provides additional example values. The models in set 2, in comparison to set 1, are each stored in association with the four received established values and inquiry values, and thus each model has a parameters matched of 100%. This difference leads to a difference in the ranking of the three models even though the received established values and inquiry values are the same between set 1 and set 2.

The asset repository 408 can store previously determined assets determined by suitable models in relation to particular inputs (e.g., inquiry values, established values, etc.). For example, in some embodiments, the decision service 406 can retrieve assets associated with a particular model if a suitable model has be previously determined for the relevant inputs (e.g., established values and inquiry values), rather than execute the model.

The model characterization module 412 can operate in parallel with the decision service 406. The model characterization module 412 can determine whether or not to create new models based on at least the established values and inquiry values received in the client request message. In some embodiments, the model characterization module 412 can retrieve external data from the external data database 414.

For example, the client request message may be include the parameters and values as depicted in Table 1. The deployment computer 400 can determine that there are no currently stored models that are similar to the received established parameters, established values, inquiry parameters, and inquiry values. For example, the deployment computer 400 can determine that no models of the plurality of are suitable models. The deployment computer 400 can then create a new model.

The model characterization module 412 can make use of the existing models, data points, and other sources of information including audit and maintenance logs from all systems, weather and climatic patterns, current events, change control patterns within the organization, etc. Enabling this component of the deployment computer 400 can result in the creation of new models. For example, an equation that represents the functions performed by the model characterization module 412 can include the following equation. Further, the sum of i is the next model.

$$\sum i = \sum_{a=1}^{i+1} \sum_{b=1}^{i+1} \sum_{c=1}^{i+1} (x_a, y_b, k_c)$$

As an example, if the deployment computer 400 has not previously created models associated with transportation applications, the deployment computer 400 can create a new model using in part additional data associated with transportation. For example, the deployment computer 400 can retrieve transportation data including bus schedules, typical wait times, road maps, and/or any other suitable data related to transportation to train a model.

The model characterization module 412 can determine a sum of the established values $x_a$ (referred to as an established sum), a sum of the inquiry values $y_b$ (referred to as an inquiry sum), and a sum of the additional data $k_c$ (referred to as an additional data sum). The established sum, the inquiry sum, and the additional data sum can be in the form of a tuple, as described herein. The tuple comprising the established sum, the inquiry sum, and the additional data sum can be labeled as the next model (e.g., i+1). The model can be trained in any suitable manner. For example, the model can be a support vector machine (SVM) trained on the additional data associated with the established values and the inquiry values. In other embodiments, the model can include a decision tree trained on the established values, inquiry values, and additional data.

As an illustrative example, the model characterization module 412 can receive the established values of [15, 99, 6, 21] and the inquiry values of [5, 23, 54, 7], as described above. The model characterization module 412 can retrieve additional values k corresponding to, for example, transportation costs based on the received established values and inquiry values. For example, the established value of 15 can correspond to an established parameter of "transit." After retrieving the additional data, the model characterization module 412 can retrieve the creation probability values z. The creation probability value z can be deterministic based on the established values and the inquiry values. As an example, the creation probability value z can be equal to the sum of the inquiry values, 89 (e.g., 89%).

The model characterization module 412 can then compute the above equation to determine the established sum, the inquiry sum, and the additional data sum. An example computation is shown below where the sum of i is the next model of i=4:

$$4 = \sum_{a=1}^{i+1} \sum_{b=1}^{i+1} \sum_{c=1}^{i+1} (x_a, y_b, k_c) = (141, 89, 5029)$$

In some embodiments, the model characterization module 412 can also train a model based on the established values, the inquiry values, and the additional data as known to one of skill in the art. The deployment computer 400 can then store the trained model and associated the model in the machine learning model database with the computed tuple of values of (141,89,5029).

After selecting suitable models, the execution service 416 may run the models, for example, to determine and/or create the assets. The execution service 416 can run the model(s) determined to be suitable. For example, one suitable model can include a decision tree model. The execution service 416 can perform the decision tree using the established values and inquiry values as input. The output of the decision tree can include a decision of which features to include in a transit application, for example, a time table, a geographic map, a current fare balance, etc. The execution service 416 can then execute a second model with these features as input to create a transportation application.

The audit service 418 can then audit the created assets in a virtual environment to verify dependencies between assets, as known to one of skill in the art.

B. Asset Selection and Creation

FIG. 5 shows a flowchart of an asset selection and creation method according to embodiments. The method illustrated in FIG. 5 will be described in the context of a client computer requesting a virtual environment comprising applications relating to transportation. It is understood, however, that the invention can be applied to other circumstances (e.g., requesting a virtual environment comprising applications relating to authentication, authorization, interactions, etc.). The method illustrated in FIG. 5 may be performed by a deployment computer.

Prior to step 502, a client computer can generate a client request message comprising a plurality of established parameters and values for the established parameters, and inquiry parameters and values for the inquiry parameters as described in detail herein. At step 502, the deployment computer can receive the client request message from the client computer. The client request message can be a request for a transit application for a virtual environment and can include, for example, established parameters of "location," "security," and "environment," corresponding to established values of "1234 Market St. San Francisco, Calif.," "nonsecret," and "DEV/QA/PROD," respectively. The client request message can further include inquiry parameters of "new technology," "new software," and "errors," corresponding to inquiry values of "hardware upgrade," "software upgrade," and "number of errors using the model for execution," respectively. Note that this example can be simplified for illustration, and other client request message embdiments can have many more inquiry and established parameters and values. In this example, the client computer requests a transit application and also inquires about whether or not the client computer needs new hardware or software to implement the transit application. The client computer can also request the number of errors for when the model is executed.

At step 504, after receiving the client request message, the deployment computer can determine whether or not to create new models. In other embodiments, the deployment computer can analyze the established values and the inquiry values included in the client request message to determine whether or not any current models can potentially fulfill the request. For example, the deployment computer can determine whether or not any current models relate to transportation data and/or information through the use of any suitable tags associated with each model. For example, a stored model can be associated with a tag of "transit." If the deployment computer determines that a currently stored model can potentially fulfill the request, then the deployment computer can determine that is should not create new models. If the deployment computer determines that no currently stored models can potentially fulfill the request, then the deployment computer can create new models.

After determining not to create new models, the deployment computer can proceed to step 506. In some embodiments, if the deployment computer determines that new models are to be created, then the deployment computer can proceed to step 522.

At step 506, the deployment computer can retrieve the established values, x, and the inquiry values, y, from the client request message. In some embodiments, the deployment computer can parse the established parameters, the established values, the inquiry parameters, and the inquiry values in the client request message in any suitable manner. For example, in some embodiments, the data in the established parameters, the established values, the inquiry parameters, and the inquiry values can be separated by delimiters in the client request message. The deployment computer can then parse the client request message using the delimiters.

At step 508, the deployment computer can retrieve the list of stored decisions from a decision database. The list of stored decisions can include a plurality of historic decision values $D_i$. The deployment computer can retrieve any suitable number of historic decision values $D_i$. For example, the deployment computer can retrieve the same number of historic decision values $D_i$ as the number of models to be retrieved at step 510, which may be i models. At step 510, the deployment computer can retrieve the list of stored models 510 from the model database. The list of stored models 510 can include i models. For example, in some embodiments, the deployment computer can retrieve every model stored in the machine learning model database as well as every historic decision value.

At step 512, after collecting the function inputs including the plurality of historic decision values, the plurality of models, the established values, and the inquiry values during steps 506-510, the deployment computer can determine a likelihood value for each model of the plurality of models. The deployment computer can determine the likelihood value for each model based on the established values, the inquiry values, and a historic decision value retrieved from a historic decision value database. For example, the deployment computer can determine the likelihood value using the equation:

$$L(i) = D_i \left( \sum_{a=1}^{N} \sum_{b=1}^{M} (x_a, y_b) \right)$$

The deployment computer can determine a sum of the established values $x_a$ (referred to as an established sum) as well as a sum of the inquiry values $y_a$ (referred to as an inquiry sum). The established sum and the inquiry sum can be in the form of a tuple (e.g., (established sum, inquiry sum)). The deployment computer can then multiply the tuple comprising the established sum and the inquiry sum by the historic decision value $D_i$ of the relevant model i to determine a likelihood value L for each model i.

As an illustrative example, the established values of "1234 Market St. San Francisco, Calif.," "non-secret," and "DEV/QA/PROD" can be encoded as the code numbers 200, 107, and 88. The inquiry values of "hardware upgrade," "software upgrade," and "number of errors using the model for execution" can be encoded as the code numbers 15, 39, and 58.

The deployment computer can determine the established sum to be 395 and the inquiry sum to be 112. The deployment computer can then multiply the established sum and the inquiry sum by a historic decision value for each model. The historic decision values can be, for example, 90, 20, and 88, corresponding to models 1, 2, and 3, respectively. As such, the deployment computer can determine the likelihood value to be L(1)=(35550,10080), L(2)=(7900, 2240), and L(3)=(34760, 9856).

In some embodiments, the deployment computer can then modify the likelihood tuple to be a likelihood value. For example, the modified likelihood value can be based on a difference value, a parameters matched value, and a percentage difference value. The deployment computer can determine a difference value for the first model, which can be equal to 25470. The parameters matched value can be 100% as the received established values and the inquiry values can match established values and inquiry values stored in association with the model. The deployment computer can also determine the percentage difference value for the first model, which can be equal to 71.6%.

It can be beneficial to compare the established sum to the established sum stored in association with the model as well as the inquiry sum to the inquiry sum stored in association with the model over simply comparing each value of the established values and inquiry values to the stored values because comparing the sums rather than every value can be more computationally efficient. Also, in some cases, the deployment computer may receive established values and inquiry values without receiving the corresponding established parameters and inquiry parameters. In this case, the deployment computer can determine the summations, as described herein, to compare to the stored summations without needing to determine the parameters associated with the values.

The deployment computer can then rank the three models based on the established sum, the inquiry sum, the decision value, the difference value, the parameters matched value, and the percentage difference value. For example, the first model may be rank 1, the second model may be rank 3, and the third model may be rank 2. After ranking the models, the deployment computer can convert the rank into a highest rank % in any suitable manner, for example, using a conversion table, which can yield the modified likelihood value.

The deployment computer can output each likelihood value determined in step 512. For example, the plurality of likelihood values determined in step 512 can include 3 likelihood values corresponding to 3 models. The 3 likelihood values can be included in any suitable data item, such as a tuple, list, etc. For example, the plurality of likelihood values can be [100, 60, 80].

At step 514, the deployment computer can, for each model of a plurality of models stored in the model database, determine if a model of the plurality of models is a suitable model based on the determined likelihood value. In some embodiments, the deployment computer can determine if a model is suitable by comparing the corresponding likelihood value of the model to a suitability threshold. The suitability threshold can be any suitable threshold. For example, the suitability threshold can be 70%, 80%, 85%, 90%, 95%, 99%, etc.

As an illustrative example, the plurality of likelihood values of [100, 60, 80] can be compared to a suitability threshold of 90%. The deployment computer can determine that two of the three likelihood values exceed (e.g., are greater than) the suitability threshold. In some embodiments, the deployment computer can create a suitability data item that can indicate the suitability of each model. The suitability data item can be, for example, [1, 0, 0] where a 0 indicates a model that is not suitable, and where a 1 indicates a model that is suitable. The position of the value in the suitability data item can indicate the model number (e.g., model 1, model 2, . . . model i).

At step 516, the deployment computer can execute the models determined to be suitable models. For example, the deployment computer can execute model 1 since it was determined to be a suitable model. As an illustrative example, model 1 can be a decision tree which can determine links to code snippets stored in a database, where each code snippet can be configured to create a transportation application. As another example, model 1 can determine, as an output, which configuration(s) to utilize to generate a transportation application. A configuration can include, for example, certain parts of a virtual machine that should be implemented (e.g., a database, a server, etc.), certain web code used to implement a transportation application, etc.

At step 518, after executing the suitable models, the deployment computer can generate one or more client response message in response to the client request message. The client response message can include one or more assets created by the one or more suitable model(s). In some embodiments, the deployment computer can include one asset in each client response message. In other embodiments, the deployment computer can include each asset in one client response message.

At step 520, after generating the one or more client response messages, the deployment computer can transmit the one or more client response messages to the client computer.

In some embodiments, after determining to create new model(s) at step 504, the deployment computer can, at step 522, retrieve the established values, x, and the inquiry values, y, from the client request message. Step 522 can be similar to step 506. As described herein, in some embodiments, steps 522-530 may be performed before, during, or after steps 506-514.

At step 524, the deployment computer can retrieve a creation probability value(s) z. The creation probability values z can include a value of the extent to which creation of a model is possible. For example, a machine learning model associated with a large creation probability value (e.g., 90%) has a high possibility of being created. Conversely, a machine learning model associated with a small creation probability value (e.g., 2%) has a low possibility of being created. In some embodiments, the creation probability value z can be tuned using an evolutionary learner. The value of the creation probability value z can be deterministic based on the established values and the inquiry values.

In some embodiments, the creation probability value z can be initially created and tuned in a controlled environment with known input values and known output values, where an error rate of the creation probability value z causing incorrect output values can be used to tune the creation probability value z. As an example, the deployment computer can retrieve a creation probability value of 84.5% based on the established values of 200, 107, and 88 and the inquiry values of 15, 39, and 58. For example, the creation probability value can be equal to the average value of both the established values and the inquiry values.

At step 526, the deployment computer can retrieve additional data from the external data database. The external data database can store data received from external sources. The additional data can include, for example, weather data, transportation data, travel data, audit logs, maintenance logs, current event data, change control patterns, etc. The deployment computer can determine whether or not to retrieve additional data based on the client request message. For example, the client request message can be a request for a transit application. The deployment computer can determine whether or not to retrieve additional data associated with transportation. The deployment computer can then retrieve transportation data from the external data database, which may be an external transportation data database. The transportation data can include, for example, bus departure and arrival times, bus stop locations, etc.

In some embodiments, the deployment computer can determine that the client request message includes an established value of 200 corresponding to "1234 Market St. San Francisco, Calif." The deployment computer can retrieve transportation data associated with, for example, San Francisco.

At step 528, after retrieving the relevant function inputs during steps 522 to 526, the deployment computer can create one or more new models using the following equation, which may be computed by an auto model generation module:

$$\sum i = \sum_{a=1}^{i+1} \sum_{b=1}^{i+1} \sum_{c=1}^{i+1} (x_a, y_b, k_c)$$

The deployment computer can compute the above equation as described herein. The deployment computer can compute the sum of each of the variables in the above equation yielding, for example, a tuple of (395, 112, 62541), also referred to as a summation value. The deployment computer can also train a model based on at least one of the established values, the inquiry values, the creation probability value, and the additional data which may be model number i=4. For example, the deployment computer can train a support vector machine using the additional data to determine classifications for a plurality of data points. The resulting classifications may be, for example, "transit regulation observed" or "transit regulation not observed," in regards to classifying whether or not a transit regulation is observed in a particular country, region, etc. As an example, model 4 can later (e.g., for this and/or a subsequent client request message) be determined as suitable for when a client computer requests a transportation application regarding transportation in San Francisco.

At step 530, after creating one or more new models, the deployment computer can store the one or more new models in the model database. In some embodiments, the deployment computer can then perform steps 506-514 using the one or more new models.

Embodiments of the invention have a number of advantages. For example, embodiments of the invention provide for a model selection system which can quickly respond to changes for a client computer's requests based on security, compliance, operational, and regulatory changes. The time to determine an appropriate asset to deploy may take weeks or even months in conventional systems, but embodiments can reduce can significantly reduce that time (e.g., minutes, hours or days).

Further, embodiments of the invention allow for a dynamic creation of models in parallel to a determination of whether or not existing models are suitable to create assets based on a client request message.

Although the steps in the flowcharts and process flows described above are illustrated or described in a specific order, it is understood that embodiments of the invention may include methods that have the steps in different orders. In addition, steps may be omitted or added and may still be within embodiments of the invention.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A method comprising:
   receiving, at a deployment computer, a client request message comprising a plurality of established parameters and established values for the established parameters, and inquiry parameters and inquiry values for the inquiry parameters from a client computer;
   determining, by the deployment computer, a likelihood value for each model of a plurality of models stored in a database based on the established values, the inquiry values, and a historic decision value retrieved from a historic decision value database;
   for each model of the plurality of models stored in the database, determining, by the deployment computer, if the model in the plurality of models is a suitable model based on the likelihood value;
   generating, by the deployment computer, one or more client response messages comprising one or more assets created by one or more suitable models; and
   transmitting, by the deployment computer, the one or more client response messages comprising the one or more assets to the client computer.

2. The method of claim 1 further comprising:
   retrieving, by the deployment computer, the plurality of models from the database.

3. The method of claim 1 further comprising:
   for each model of the plurality of models, comparing the likelihood value to a predetermined threshold; and
   for each model of the plurality of models, determining if the model is suitable if the likelihood value exceeds the predetermined threshold.

4. The method of claim 3, wherein the likelihood value is in a range of 0-100, and the predetermined threshold is in a range of 0-100.

5. The method of claim 1, wherein the historic decision value is based on at least previously determined likelihood values.

6. The method of claim 1 further comprising:
determining, by the deployment computer, the one or more assets from an asset repository corresponding to the one or more suitable models; and
providing, by the deployment computer, access to the one or more assets to the client computer.

7. The method of claim 1, wherein the plurality of models comprise a plurality of machine learning models.

8. The method of claim 1, wherein at least one the plurality of models comprises a fraud determination model.

9. The method of claim 1, wherein at least one of the plurality of models is based on a neural network.

10. A method of comprising:
receiving, at a deployment computer, a client request message comprising a plurality of established parameters and established values for the established parameters, and inquiry parameters and inquiry values for the inquiry parameters from a client computer;
for each model of a plurality of models stored in a database, determining, by the deployment computer, if the model in the plurality of models is a suitable model based on a likelihood value;
generating, by the deployment computer, one or more client response messages comprising one or more assets created by one or more suitable models; and
transmitting, by the deployment computer, the one or more client response messages comprising the one or more assets to the client computer,
wherein the method further comprises:
determining, by the deployment computer, whether or not to create a new model based on the client request message;
after determining to create the new model, determining, by the deployment computer, a summation value based on the established values, the inquiry values, creation probability values, and additional data; and
storing, by the deployment computer, a model determined based on the summation value into the database.

11. A deployment computer comprising:
a processor;
a memory device; and
a computer-readable medium coupled to the processor, the computer-readable medium comprising code executable by the processor for implementing a method comprising:
receiving a client request message comprising a plurality of established parameters and established values for the established parameters, and inquiry parameters and inquiry values for the inquiry parameters from a client computer;
determining a likelihood value for each model of a plurality of models stored in a database based on the established values, the inquiry values, and a historic decision value retrieved from memory;
for each model of the plurality of models stored in the database, determining if the model in the plurality of models is a suitable model based on the likelihood value;
generating one or more client response messages comprising one or more assets created by one or more suitable models; and
transmitting the one or more client response messages comprising the one or more assets to the client computer.

12. The deployment computer of claim 11, wherein the method further comprises:
retrieving, by the deployment computer, the plurality of models from the database.

13. The deployment computer of claim 11, wherein the method further comprises:
for each model of the plurality of models, comparing the likelihood value to a predetermined threshold; and
for each model of the plurality of models, determining if the model is suitable if the likelihood value exceeds the predetermined threshold.

14. The deployment computer of claim 13, wherein the likelihood value is in a range of 0-100, and the predetermined threshold is in a range of 0-100.

15. The deployment computer of claim 11, wherein the historic decision value is based on at least previously determined likelihood values.

16. The deployment computer of claim 11, wherein the method further comprises:
determining, by the deployment computer, the one or more assets from an asset repository corresponding to the one or more suitable models; and
providing, by the deployment computer, access to the one or more assets to the client computer.

17. A deployment computer comprising:
a processor;
a memory device; and
a computer-readable medium coupled to the processor, the computer-readable medium comprising code executable by the processor for implementing a method comprising:
receiving a client request message comprising a plurality of established parameters and established values for the established parameters, and inquiry parameters and inquiry values for the inquiry parameters from a client computer;
for each model of a plurality of models stored in a database, determining if the model in the plurality of models is a suitable model based on a likelihood value;
generating one or more client response messages comprising one or more assets created by one or more suitable models; and
transmitting the one or more client response messages comprising the one or more assets to the client computer, and wherein the method further comprises:
determining, by the deployment computer, whether or not to create a new model based on the client request message;
after determining to create the new model, determining, by the deployment computer, a summation value based on the established values, the inquiry values, creation probability values, and additional data; and
storing, by the deployment computer, a model determined based on the summation value into the database.

18. A deployment computer comprising:
a processor;
a memory device; and
a computer-readable medium operatively coupled to the processor, the computer-readable medium comprising code executable by the processor for implementing a method comprising:
receiving a client request message comprising a plurality of established parameters and established values for the established parameters, and inquiry parameters and inquiry values for the inquiry parameters from a client computer;

for each model of a plurality of models stored in a database, determining if the model in the plurality of models is a suitable model based on a likelihood value;

generating one or more client response messages comprising one or more assets created by one or more suitable models; and transmitting the one or more client response messages comprising the one or more assets to the client computer, and wherein the computer medium further comprises:

a request service module;
a model determination module;
a model characterization module;
an execution module; and
an audit module.

19. A method comprising:

generating, by a client computer, a client request message comprising a plurality of established parameters and values for the established parameters, and inquiry parameters and values for the inquiry parameters;

transmitting, by the client computer, the client request message to a deployment computer, wherein the deployment computer, for each model of a plurality of models stored in a database, determines if a model in the plurality of models is a suitable model based on a likelihood value, and generates one or more client response messages comprising one or more assets created by one or more suitable models; and receiving, by the client computer, the one or more client response messages from the deployment computer, wherein the deployment computer further determines whether or not to create a new model based on the client request message, determines a summation value based on the values for the established parameters, the values for the inquiry parameters, creation probability values, and additional data, and stores the new model determined based on the summation value into the database.

20. The method of claim 19, wherein the likelihood value is determined based on at least a historic decision value, wherein the historic decision value is associated with the client computer.

* * * * *